United States Patent
Kawamura

[19]

[11] Patent Number: 6,049,741
[45] Date of Patent: Apr. 11, 2000

[54] METHOD OF PREDICTING A FAILURE AND CONTROL UNIT AND LOAD CONTROLLING SYSTEM USING THE SAME

[75] Inventor: Yoshihiro Kawamura, Shizuoka, Japan

[73] Assignee: Yazaki Corporation, Tokyo, Japan

[21] Appl. No.: 08/909,051

[22] Filed: Aug. 11, 1997

[30] Foreign Application Priority Data

Aug. 9, 1996 [JP] Japan ................................. 8-211571

[51] Int. Cl.[7] .................................................. G05B 9/02
[52] U.S. Cl. ............................ 700/80; 702/34; 702/181; 395/183.13; 395/183.01
[58] Field of Search .............. 702/34, 181; 395/182.04, 395/185.1, 183.01, 183.03, 183.13, 183.18; 700/80

[56] References Cited

U.S. PATENT DOCUMENTS

| | | | |
|---|---|---|---|
| 5,210,704 | 5/1993 | Husseiny | 702/34 |
| 5,455,777 | 10/1995 | Fujiyama et al. | 702/34 |
| 5,500,940 | 3/1996 | Skeie | 395/183.01 |
| 5,710,723 | 1/1998 | Hoth et al. | 702/181 |
| 5,727,144 | 3/1998 | Brady et al. | 395/182.04 |

FOREIGN PATENT DOCUMENTS 5-56555  3/1993  Japan.

*Primary Examiner*—William Grant
*Assistant Examiner*—Sheela S. Rao
*Attorney, Agent, or Firm*—Sughrue, Mion, Zinn, Macpeak & Seas, PLLC

[57] ABSTRACT

A control unit for controlling a load is provided with a durable-time diagnosing device for generating integrated count data by integrating an operating time of the load, and for generating warning data for notification when the integrated count data has reached the durable time, and concurrently generating an interrupt command for prompting processing for stopping the driving of the load which approached a limit of its life. A notification is given to the effect that the load has approached a limit of its life when the integrated time has reached a durable time set in advance concerning the load. A method of predicting a failure of a load using the control units and a load controlling system using the control units are also disclosed.

10 Claims, 4 Drawing Sheets

METHOD OF PREDICTING A FAILURE AND CONTROL UNIT AND LOAD CONTROLLING SYSTEM USING THE SAME

BACKGROUND OF THE INVENTION

1. Field of the Invention

The present invention relates to a method of predicting a failure of a load, such as electronic equipment and parts, as well as a control unit and a load controlling system using the method. More particularly, the present invention concerns a method of predicting a failure, which is capable of diagnosing the durable life of electronic equipment and parts serving as loads, and of notifying an operator to the effect that the load has approached a limit of its life and that replacement of the electronic equipment or parts is prompted, as well as a control unit and a load controlling system using the method.

2. Description of the Related Art

As a conventional failure predicting method of this type and a load controlling system using the same, those which are disclosed in, for example, Japanese Patent Unexamined Publication No. Hei. 5-56555 are known.

In the invention disclosed in Japanese Patent Unexamined Publication No. Hei. 5-56555, there is provided a failure predicting apparatus, in which characteristic-amount data, such as a making current value and a steady-state current value, are extracted in advance from a load current waveform due to the normal switching action in an early period and are stored as reference characteristic-amount data in a storage means, and which effects the prediction and diagnosis of a failure by means of a inferring means through fuzzy inference on the basis of the characteristic-amount data extracted from the load current waveform and the reference characteristic-amount data each time an input is given to a relay.

However, with such a conventional failure predicting apparatus, it is necessary to determine membership functions for effecting the fuzzy inference for each of various loads, and, in order to determine such membership functions, it is necessary to extract different characteristic amounts for each of the loads. Hence, there has been a technical problem in that the scale of the apparatus increases, and software becomes complicated.

SUMMARY OF THE INVENTION

In view of the above-described circumstances, it is an object of the present invention to provide a method of predicting a failure of a load, which is capable of predicting the durable life of loads by flexibly and speedily coping with the structuring of the environment of a system structured with various loads connected thereto, even by using simple apparatus and software without entailing complications of the scale of the apparatus and software, and which consequently facilitates the management of stocks of the loads for replacement, as well as a control unit and a load controlling system using the method.

To this end, in accordance with a first aspect of the present invention, there is provided a method of predicting a failure, comprising the steps of: calculating an integrated time by integrating an operating time of a load; and notifying that the load has approached a limit of its life when the integrated time has reached a durable time set in advance concerning the load.

In accordance with a second aspect of the present invention, there is provided a control unit for controlling a load using the method of predicting a failure according to the first aspect of the invention, comprising: durable-time diagnosing means for generating integrated count data by integrating the operating time of the load, and for generating warning data for the notification when the integrated count data has reached the durable time, and concurrently generating an interrupt command for prompting processing for stopping the driving of the load which has approached the limit of its life.

In accordance with a third aspect of the present invention, there is provided the control unit according to the second aspect of the invention, further comprising: an intelligent power source constituting means for driving the load and adapted to generate a status signal after driving the load and generate a load abnormality signal upon detecting an abnormality of the load; a clock generating unit for generating a clock of a predetermined period in correspondence with the status signal during the driving of the load; an operating-time integrating unit for integrating pulses of the clock and generating the integrated count data by adding the integrated time, which is calculated on the basis of the number of the integrated clock pulses and the clock period, to former-integrated-count data which represents a time integrated until then; a table generating unit for generating durable-time table data in which a relationship of correspondence between a kinds of the load and a durable time corresponding to the kind of the load is described; a memory controlling unit having a table storage portion for storing the durable-time table data generated by the table generating unit and an integrated-time storage portion for storing the integrated count data generated by the operating-time integrating unit; and a determining unit for reading and comparing the durable-time table data stored in the table storage portion and the integrated count data stored in the integrated-time storage portion, and generating at least one of the warning data and the interrupt command when the integrated count data has reached the durable-time table data.

In accordance with a fourth aspect of the present invention, there is provided a load controlling system to which the control unit according to the third aspect of the invention is connected, comprising: a plurality of control units connected to a communication line through a communication interface for transmitting or receiving ID data concerning control specifications of each of the loads connected to the load controlling system, and for executing the transmission and reception of the ID data through the communication line so as to control the loads on the basis of the transmitted or received ID data, wherein the ID data includes at least data on a kind of load used for generating the durable-time table data, data on a durable time corresponding to the kind of load, and diagnosis information for diagnosing an operating state of the load.

In accordance with a fifth aspect of the present invention, there is provided a load controlling system to which the control unit according to the third aspect of the invention is connected for effecting multiplex processing through a communication line capable of multiplex transmission of ID data concerning control specifications of each of loads, and which is capable of controlling the connected loads on the basis of the ID data subjected to the multiplex processing, comprising: a master control unit which is the control unit connected to the communication line through a communication interface and capable of executing as a main system the multiplex processing based on the ID data; and at least one slave-load controlling unit which is the control unit connected to the communication line through a communication interface for transmitting or receiving ID data, and for executing the multiplex processing as a subsidiary system between the slave-load controlling unit and the master control unit through the communication line, wherein the ID data includes at least data on a kind of load used for generating the durable-time table data, data on a durable time corresponding to the kind of load, and diagnosis information for diagnosing an operating state of the load.

DETAILED DESCRIPTION OF THE PREFERRED EMBODIMENT

Hereafter, a description will be given of an embodiment of the present invention with reference to the accompanying drawings.

Figure 1:
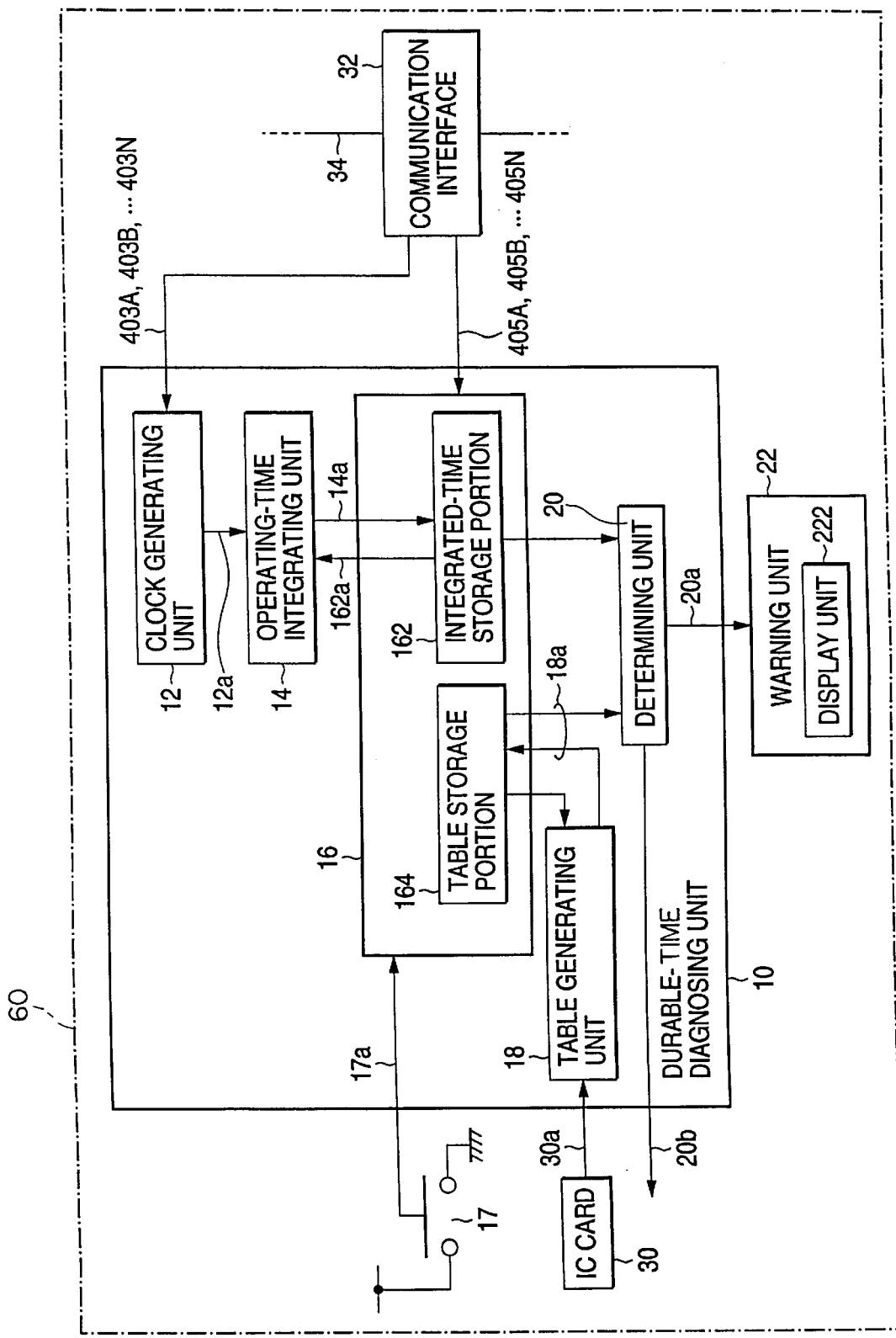
FIG. 1 is a functional block diagram for explaining an embodiment of a control unit using a failure diagnosing method of the present invention.
Figure 2:
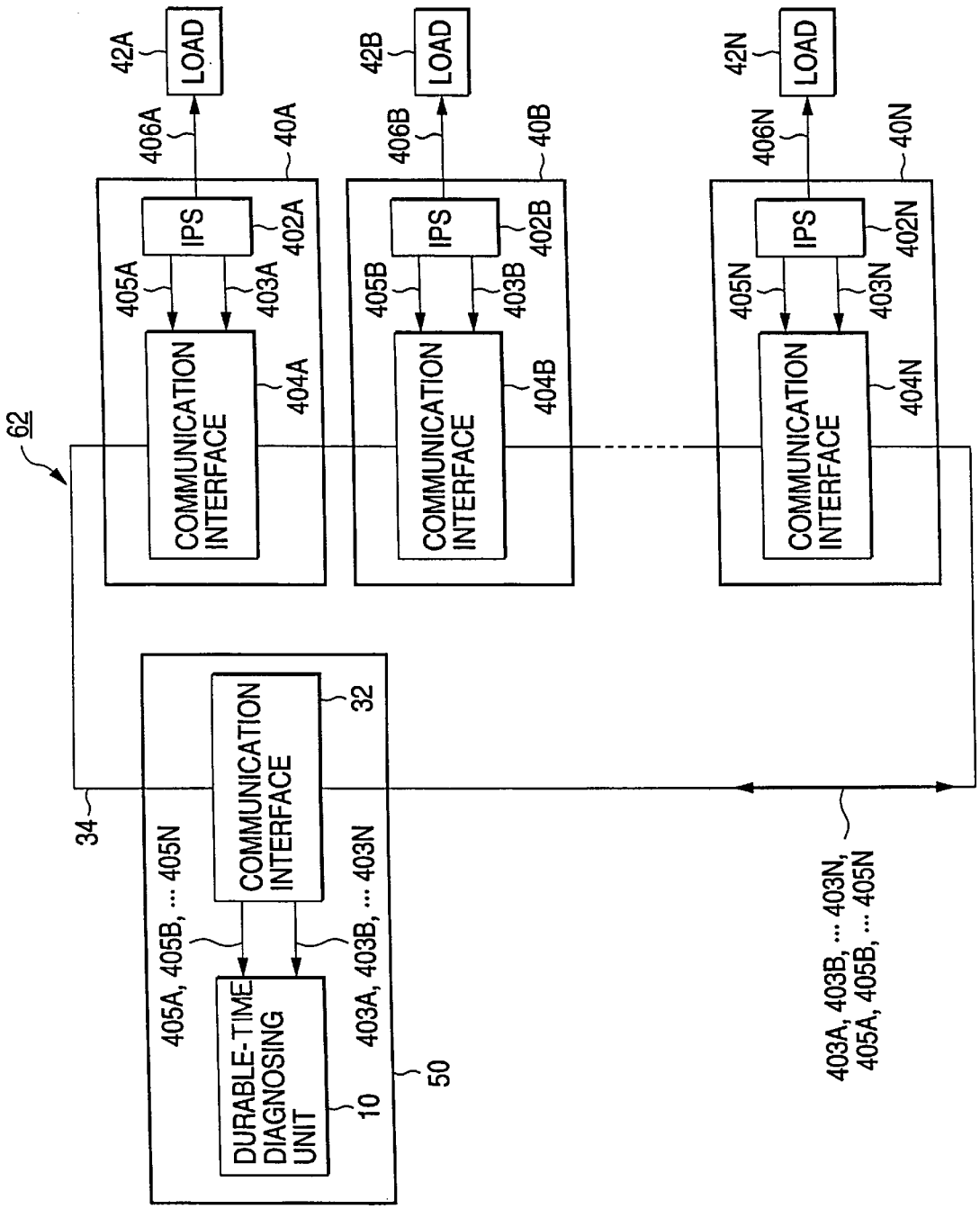
FIG. 2 is a functional block diagram for explaining an embodiment of a load controlling system using the control unit shown in FIG. 1.

FIG. 1 is a functional block diagram for explaining an embodiment of a control unit 60 using the failure diagnosing method of the present invention. FIG. 2 is a functional block diagram for explaining an embodiment of a load controlling system 62 using the control unit 60 shown in FIG. 1.

As shown in FIG. 2, connected to this load controlling system 62 is a master control unit 50 serving as the control unit 60 of a main system (a master in a so-called master-slave system, i.e., a kind of a system for synchronizing data transmission and reception) which has the function of effecting the multiplex processing of ID data 30a concerning control specifications of each of electronic equipment (e.g., an air-conditioner) and electronic parts (e.g., an ignitor and lamps), serving as loads 42A, 42B, . . . , 42N loaded in a vehicle such as an automobile, a train, or the like, through a communication line 34 capable of multiple transmission, and which is capable of controlling the loads 42A, 42B, . . . , 42N connected thereto, on the basis of the ID data 30a thus subjected to multiplex processing. Also connected to the load controlling system 62 are a plurality of slave load-controlling units 40A, 40B, . . . , 40N serving as subsidiary systems (slaves in the aforementioned master-slave system).

The master control unit 50, which constitutes the control unit 60, is connected to the communication line 34 (specifically, a communication cable) via a communication interface 32, and is capable of executing the multiplex processing based on the ID data 30a as a main system.

The slave load-controlling units 40A, 40B, . . . , 40N, which also constitute the control unit 60, are respectively connected to the communication line 34 via communication interfaces 404A, 404B, . . . , 404N to multiplex the ID data 30a and transmit and receive the same, and respectively execute multiplex processing as subsidiary systems with respect to the master control unit 50 via the communication line 34.

Intelligent power sources (IPS's) 402A, 402B, . . . , 402N shown in FIG. 2 are driving means for respectively driving the loads 42A, 42B, . . . , 42N, and have the functions of generating status signals 403A, 403B, . . . , 403N for notifying an external circuit outside the IPS's 402A, 402B, . . . , 402N of driven states of the loads while the loads 42A, 42B, . . . , 42N are being driven, of detecting an abnormality (specifically, a shortcircuiting, a disconnection, or an overcurrent) which has occurred in any one of the loads 42A, 42B, . . . , 42N being driven, and of notifying the external circuit of this abnormal state (as mentioned above, the shortcircuited state, the disconnected state, or the overcurrent state) of the load through diagnosis information 306 (specifically, load abnormality signals 405A, 405B, . . . , 405N).

Figure 3:
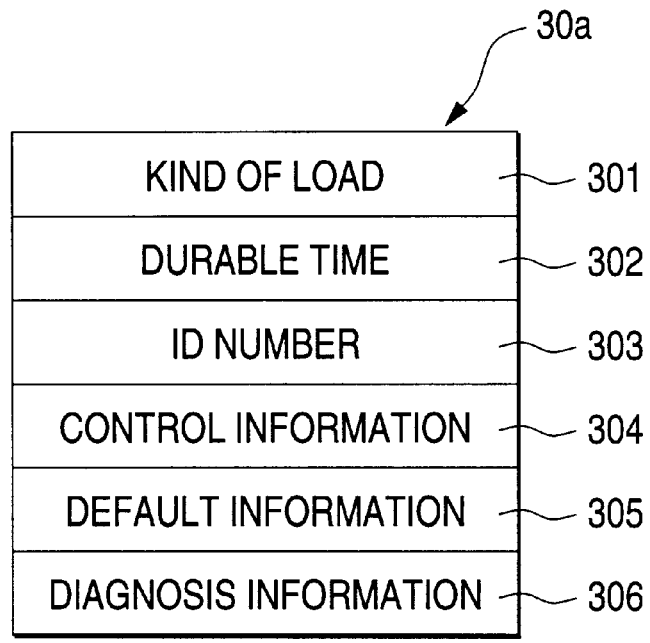
FIG. 3(a) is a diagram illustrating a format of ID data which is used in the embodiment shown in FIG. 1.
FIG. 3(b) is a diagram illustrating diagnosis information which is used in the format of the ID data shown in FIG. 3(a)
Figure 3:
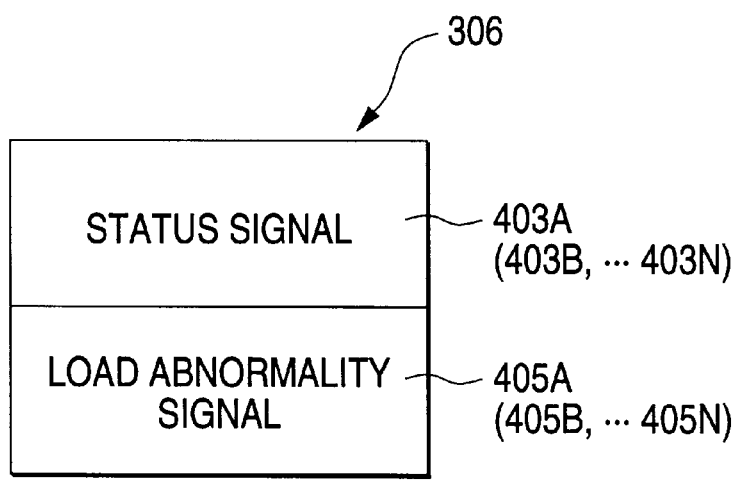

FIG. 3(a) is a diagram illustrating a format of the ID data 30a which is used in the embodiment shown in FIG. 1, and FIG. 3(b) is a diagram illustrating the diagnosis information 306 which is used in the format of the ID data shown in FIG. 3(a).

As shown in FIG. 3(a), the ID data 30a which is multiplexed is comprised of at least data 301 on the kind of load 42A (42B, . . . , 42N) used for generating durable-time table data 18a; data 302 on a durable time corresponding to the kind of load; data 303 on an identification number used by the master control unit 50 and the slave load-control units 40A, 40B, . . . , 40N in identifying each load in the multiplex system; control information 304 showing control specifications of load (specifically, drive voltage and absolute standards); default information 305 which is used as specified control specifications when an abnormality has occurred in the multiplex communication; and the diagnosis information 306 for diagnosing an operating state of the load 42A (42B, . . . , 42N).

As shown in FIG. 3(b), the diagnosis information 306 provided in the ID data 30a has a status signal 403A (403B, . . . , 403N) and the load abnormality signal 405A (405B, . . . , 405N).

Since the multiplex processing of the ID data 30a having the diagnosis information 306 is effected between the master control unit 50 on the one hand, and the slave load-controlling units 40A, 40B, . . . , 40N on the other hand, the master control unit 50 is capable of executing the diagnosis of the durable life with respect to the respective slave load-controlling units 40A, 40B, . . . , 40N in the above-described manner, it becomes possible to predict the durable life of loads 42A, 42B, . . . , 42N by flexibly and speedily coping with the structuring of the environment of a system structured with various loads 42A, 42B, . . . , 42N connected thereto, even by using simple apparatus and software without entailing complications of the scale of the apparatus and software, with the result that the management of stocks of the loads 42A, 42B, . . . , 42N for replacement is facilitated.

Next, a description will be given of the control unit 60.

The control unit 60 has the function of diagnosing the durable life of each of electronic equipment (e.g., an air-conditioner) and electronic parts (e.g., an ignitor and lamps), serving as loads 42A, 42B, . . . , 42N loaded in a vehicle, and of notifying an operator to the effect that the load 42A (42B, . . . , 42N) has approached a limit of its life and that replacement of the electronic equipment or part is prompted. As shown in FIG. 1, the control circuit 60 is provided with a durable-time diagnosing unit 10, a warning unit 22, an IC card 30, the communication interface 32, and a reset switch 17.

The aforementioned durable time, which is set in advance, is desirably determined on the basis of the point of time at which it is determined to be impossible to maintain desired characteristics, by conducting durability tests for each load in advance.

The durable-time diagnosing unit 10 has the functions of generating integrated count data 14a by integrating the operating time of each load 42A (42B, . . . , 42N), of generating warning data 20a for notifications such as those described above when the integrated count data 14a has approached a limit of the aforementioned durable time, and of concurrently generating an interrupt command 20b for prompting processing for stopping the driving of the load 42A (42B, . . . , 42N) which approached the limit of its life and imparting the same to the system having controlling power higher than this control unit 60. The durable-time diagnosing unit 10 is provided with a clock generating unit 12, an operating-time integrating unit 14, a memory controlling unit 16, and a determining unit 20.

Such a durable-time diagnosing unit 10 can be realized by a microcomputer which is mainly comprised of a CPU for various arithmetic operations, a RAM for storing results of the arithmetic operations and the like, and a peripheral interface for effecting the transmission and reception of data.

The clock generating unit 12 has the function of generating a clock pulse 12a of a predetermined period in correspondence with each of the status signals 403A, 403B, . . . , 403N during the driving of the loads 42A, 42B, . . . , 42N.

Such a clock generating unit 12 is mainly comprised of a clock IC for generating the clock pulse 12a of the predetermined period and the peripheral interface for effecting the transmission and reception of data.

The operating-time integrating unit 14 has the function of integrating pulses of the clock 12a and generating the integrated count data 14a by adding the integrated time, which is calculated on the basis of the number of the integrated clock pulses at this time and the clock period, to former-integrated-count data 162a which represents the time integrated until then.

Such an operating-time integrating unit 14 can be realized by a microcomputer which is mainly comprised of a CPU for various arithmetic operations, a RAM for storing results of the arithmetic operations and the like, and a peripheral interface for effecting the transmission and reception of data.

A table generating unit 18 has the function of generating the durable-time table data 18a in which relationships of correspondence between the kinds of the loads 42A, 42B, . . . , 42N and the durable times corresponding to the kinds of the loads are described.

Such a table generating unit 18 can be realized by a microcomputer which is mainly comprised of a CPU for various arithmetic operations, a RAM for storing results of the arithmetic operations, the durable-time table data 18a and the like, and a peripheral interface for effecting the transmission and reception of data.

The memory controlling unit 16 has a table storage portion 164 for storing the durable-time table data 18a generated by the table generating unit 18 and an integrated-time storage portion 162 for storing the integrated count data 14a generated by the operating-time integrating unit 14.

Further, the memory controlling unit 16 is arranged to execute control in which the integrated count data 14a stored in the integrated-time storage portion 162 is reset in correspondence with at least one of the load abnormality signals 405A, 405B, . . . , 405N and a reset signal 17a imparted from the outside (e.g., the reset switch 17 in FIG. 1), thereby setting the integrated value of the integrated count data 14a at this time to zero.

Such a memory controlling unit 16 (the integrated-time storage portion 162 and the table storage portion 164) can be realized by a microcomputer which is mainly comprised of a nonvolatile memory such as an EEPROM for storing the integrated count data 14a, the durable-time table data 18a and the like, a CPU for various arithmetic operations, and a peripheral interface for effecting the transmission and reception of data.

Thus, since the operation of resetting the integrated count data 14a necessary for replacing the load 12A (12B, . . . , 12N) to zero can be executed by using the load abnormality signals 405A, 405B, . . . , 405N or the reset signal 17a, it becomes possible to flexibly and speedily cope with the replacement of the load 42A (42B, . . . , 42N) which has reached a limit of its durable life in the structuring of the environment of a system structured with the various loads 42A, 42B, . . . , 42N connected thereto, even by using simple apparatus and software without entailing complications of the scale of the apparatus and software.

The determining unit 20 has the functions of reading and comparing the durable-time table data 18a stored in the table storage portion 164 and the integrated count data 14a stored in the integrated-time storage portion 162, and of generating at least one of the warning data 20a and the interrupt command 20b when the integrated count data 14a has reached the durable-time table data 18a at this time.

Such a determining unit 20 can be realized by a microcomputer which is mainly comprised of a CPU for various arithmetic operations, a RAM for storing results of the arithmetic operations and the like, and a peripheral interface for effecting the transmission and reception of data.

By virtue of the provision of such a durable-time diagnosing unit 10, the operating-time integrating unit 14 generates the integrated count data 14a by using as a reference the durable time which is set in advance it the table generating unit 18, and the determining unit 20 executes the diagnosis of the durable life with respect to the integrated count data 14a by using the clock 12a based on the status signals 403A, 403B, . . . , 403N, it is possible to predict the durable life of loads 42A, 42B, . . . , 42N by flexibly and speedily coping with the structuring of the environment of a system structured with various loads 42A, 42B, . . . , 42N connected thereto, even by using simple apparatus and software without entailing complications of the scale of the apparatus and software, with the result that the management of stocks of the loads 42A, 42B, . . . , 42N for replacement can be facilitated.

The IC card 30 is a storage means which is mainly comprised of a semiconductor storage device such as an EEPROM from which data can be freely read, and the ID data 30a on the relationships of correspondence between the kinds of the loads 42A, 42B, . . . , 42N and the durable times is stored in the IC card 30.

In this case, the table generating unit 18 is arranged to read the ID data 30a from the IC card 30 and generate the durable-time table data 18a.

By virtue of the provision of such an IC card 30, the ID data 30a (i.e., the durable-time table data 18a) can be set in advance in the handy-to-carry IC card 30 at even a factory or the like which is remote from the system, so that it is possible to flexibly and speedily cope with the structuring of the environment of a system structured with the various loads 42A, 42B, . . . , 42N connected thereto, thereby facilitating the management of stocks of the loads 42A, 42B, . . . , 42N for replacement.

The warning unit 22 has the function of notifying the operator that the life of the load 42A (42B, . . . , 42N) has approached a limit its life, upon receipt of the warning data 20a.

This warning function is specifically realized by a display or a warning sound. The warning sound can be realized by a buzzer or the like.

In addition, the warning unit 22 is preferably provided with a display unit 222 as shown in FIG. 1 so as to provide the aforementioned display and impart a message concerning more detailed advice on the replacement of the load.

Such a warning unit 22 can be realized by a microcomputer which is mainly comprised of a CPU for various arithmetic operations, a RAM for storing results of the arithmetic operations and the like, and a peripheral interface for effecting the transmission and reception of data.

Next, a description will be given of the method of predicting a failure by using the control unit 60 shown in FIG. 1.

Figure 4:
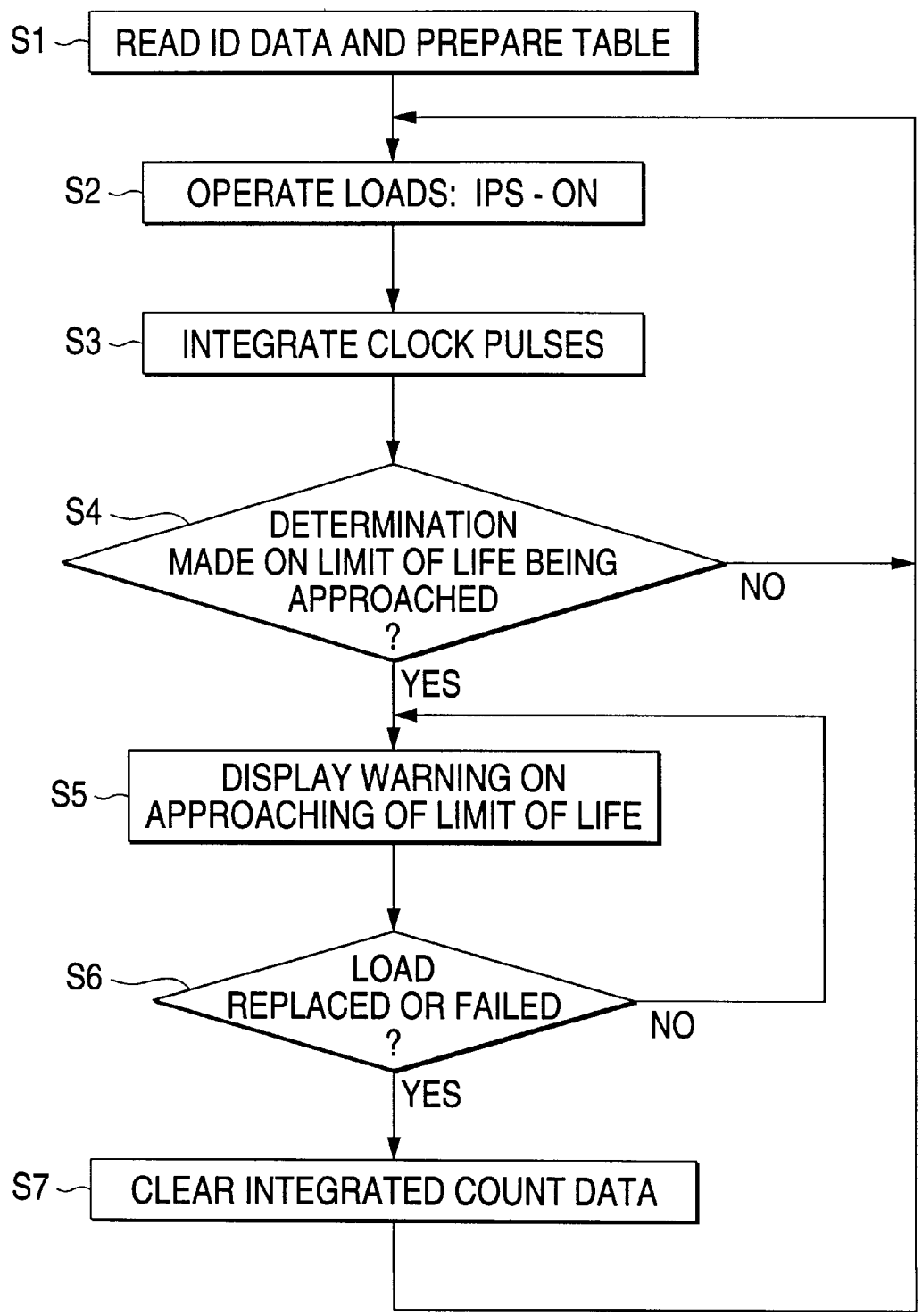
FIG. 4 is a flowchart for explaining the failure diagnosing method by using the control unit shown in FIG. 1.

FIG. 4 is a flowchart for explaining the method of predicting a failure by using the control unit 60 shown in FIG. 1.

This method of predicting a failure is provided with the functions of calculating an integrated time by integrating a load operating time and of notifying the operator that the life of the load has approached a limit its life when the integrated time at this time reached the durable time set in advance concerning the load, and the failure-predicting method is comprised of Steps S1 to S7.

In Step S1, when the failure prediction processing is started, the ID data 30a on the loads 42A, 42B, . . . , 42N stored in the IC card 30 is read. Subsequently, the table generating unit 18 generates the durable-time table data 18a by using the ID data 30a from the IC card 30. Then, the generated durable-time table data 18a is stored in the table generating unit 18 (specifically, the EEPROM).

In Step S2, the IPS 402A (402B, . . . , 402N) generates the status signal 403A (403B, . . . , 403N) for notifying an external circuit outside the IPS 402A (402B, . . . , 402N) of the driven state of the load while the load 42A (42B, . . . , 42N) is being driven, detects an abnormality (specifically, a shortcircuiting, a disconnection, or an overcurrent of the load) which has occurred in the load 42A (42B, . . . , 42N) being driven, and notifies the external circuit of this abnormal state (as mentioned above, the shortcircuited state, the disconnected state, or the overcurrent state) of the load through the diagnosis information 306.

In Step S3, the clock generating unit 12 receives the status signal 403A (403B, . . . , 403N) during the driving of the load 42A (42B, . . . , 42N) and generates the clock 12a of a predetermined period. Subsequently, the operating-time integrating unit 14 integrates pulses of the clock 12a, and adds the integrated time, which is calculated on the basis of the number of the integrated clock pulses at this time and the clock period, to the former-integrated-count data 162a which represents the time integrated until then, so as to generate the integrated count data 14a (i.e., the generated integrated count data 14a=the former-integrated-count data 162a+integrated time (unit: time)).

In Step S4, the determining unit 20 reads and compares the durable-time table data 18a stored in the table storage portion 164 and the integrated count data 14a stored in the integrated-time storage portion 162, and generates at least one of the warning data 20a and the interrupt command 20b when the integrated count data 14a reached the durable-time table data 18a at this time (YES in Step S4).

In Step S5, the warning unit 22, upon receipt of the warning data 20a, notifies the operator that the life of the load 42A (42B, . . . , 42N) has approached a limit of its life.

In Step S6, a determination is made as to whether the load has been replaced with a new one or whether an abnormality of the load (i.e., a failed state of the load) has occurred.

In Step S7, in the case where the load has been replaced with a new one or where an abnormality of the load (i.e., a failed state of the load) has occurred (YES in Step S6), the memory controlling unit 16 executes control in which the integrated count data 14a stored in the integrated-time storage portion 162 is reset in correspondence with at least one of the load abnormality signals 405A, 405B, . . . , 405N and the reset signal 17a imparted from the outside (e.g., the reset switch 17 in FIG. 1), thereby setting the integrated value of the integrated count data 14a at this time to zero. In other cases (NO in Step S6), the operation jumps to Step S5.

After completion of Step S7, the operation jumps to Step S2, and the operation in Steps S2 through S7 is executed in a loop.

As described above, according to the present embodiment, since the diagnosis of the durable life is executed by using as a reference the durable time which is set in advance, it is possible to predict the durable life of loads 42A, 42B, . . . , 42N by flexibly and speedily coping with the structuring of the environment of a system structured with various loads 42A, 42B, . . . , 42N connected thereto, even by using simple apparatus and software without entailing complications of the scale of the apparatus and software, with the result that the management of stocks of the loads 42A, 42B, . . . , 42N for replacement can be facilitated.

What is claimed is:

1. A control unit for predicting a failure by calculating an integrated time by integrating an operating time of a load; and notifying that the load has approached a limit of its life when the integrated time has reached a durable time set in advance concerning the load, comprising:

durable-time diagnosing means for generating integrated count data by integrating the operating time of the load, and for generating warning data for the notification when the integrated count data has reached the durable time, and concurrently generating an interrupt command for prompting processing for stopping the driving of the load which has approached the limit of its life;

an intelligent power source constituting means for driving the load and adapted to generate a status signal after driving the load and generate a load abnormality signal upon detecting an abnormality of the load;

a clock generating unit for generating a clock of a predetermined period in correspondence with the status signal during the driving of the load;

an operating-time integrating unit for integrating pulses of the clock and generating the integrated count data by adding the integrated time, which is calculated on the basis of the number of the integrated clock pulses and the clock period, to former-integrated-count data which represents a time integrated until then;

a table generating unit for generating durable-time table data in which a relationship of correspondence between a kinds of the load and a durable time corresponding to the kind of the load is described;

a memory controlling unit having a table storage portion for storing the durable-time table data generated by said table generating unit and an integrated-time storage portion for storing the integrated count data generated by said operating-time integrating unit; and a determining unit for reading and comparing the durable-time table data stored in said table storage portion and the integrated count data stored in said integrated-time storage portion, and generating at least one of the warning data and the interrupt command when the integrated count data has reached the durable-time table data.

2. The control unit according to claim 1, further comprising:
an IC card from which data can be freely read, and in which the relationship of correspondence between the kind of the load and the durable time is stored,
wherein said table generating unit is arranged to read the relationship of correspondence from said IC card and generate the durable-time table data.

3. The control unit according to claim 1, wherein said memory controlling unit is arranged to execute control in which the integrated count data stored in said integrated-time storage portion is reset in correspondence with at least one of the load abnormality signal and a reset signal imparted from an outside, so as to set an integrated value of the integrated count data to zero.

4. The control unit according to claim 1, further comprising:
warning means for notifying that the load has approached the limit of its life, upon receipt of the warning data.

5. The control unit according to claim 1 further comprising a load controlling system connected to said control unit; wherein said load controlling system comprises:
a plurality of control units connected to a communication line through a communication interface for transmitting or receiving ID data concerning control specifications of each of the loads connected to said load controlling system, and for executing the transmission and reception of the ID data through the communication line so as to control the loads on the basis of the transmitted or received ID data,
wherein the ID data includes at least data on a kind of load used for generating the durable-time table data, data on a durable time corresponding to the kind of load, and diagnosis information for diagnosing an operating state of the load.

6. The control unit according to claim 5, wherein said IC card stores the ID data, and said table generating unit reads the ID data from said IC card and generates the durable-time table data.

7. The control unit according to claim 1, further comprising a load controlling system connected to said control unit; wherein said load controlling system is connected for effecting multiplex processing through a communication line capable of multiplex transmission of ID data concerning control specifications of each of loads, and wherein said load controlling system is capable of controlling the connected loads on the basis of the ID data subjected to the multiplex processing, said load controlling system further comprising:
a master control unit which is said control unit connected to the communication line through a communication interface and capable of executing as a main system the multiplex processing based on the ID data; and
at least one slave-load controlling unit which is said control unit connected to the communication line through a communication interface for transmitting or receiving ID data, and for executing the multiplex processing as a subsidiary system between said slave-load controlling unit and said master control unit through the communication line,
wherein the ID data includes at least data on a kind of load used for generating the durable-time table data, data on a durable time corresponding to the kind of load, and diagnosis information for diagnosing an operating state of the load.

8. The control unit according to claim 7, wherein said IC card stores the ID data, and said table generating unit reads the ID data from said IC card and generates the durable-time table data.

9. A durable time diagnosing unit comprising:
a clock generating unit, wherein said clock generating unit generates clock pulses in response to operation of said load;
an operating time integrating unit, wherein said operating time integrating unit computes an integrated time by integrating said clock pulses;
a table generating unit, wherein said table generating unit generates a durable time for said load;
a memory controlling unit including an integrated time storage portion storing said integrated time; and
a determining unit, wherein said determining unit compares said integrated time to said durable time and generates a signal indicating when said load has approached said predetermined durable time limit by a given amount.

10. A control unit for predicting a failure by calculating an integrated time by integrating an operating time of a load; and notifying that the load has approached a limit of its life when the integrated time has reached a durable time set in advance concerning the load; comprising:
a durable-time diagnosing unit which generates integrated count data by integrating the operating time of the load, and which generates warning data for the notification when the integrated count data has reached the durable time, and concurrently generates an interrupt command for prompting processing for stopping the driving of the load which has approached the limit of its life;
an intelligent power source constituting unit which drives the load and is adapted to generate a status signal after driving the load and generate a load abnormality signal upon detecting an abnormality of the load;
a clock generating unit which generates a clock of a predetermined period in correspondence with the status signal during the driving of the load;
an operating-time integrating unit which integrates pulses of the clock and generates the integrated count data by adding the integrated time, which is calculated on the basis of the number of the integrated clock pulses and the clock period, to former-integrated-count data which represents a time integrated until then;
a table generating unit which generates durable-time table data in which a relationship of correspondence between a kinds of the load and a durable time corresponding to the kind of the load is described;
a memory controlling unit having a table storage portion which stores the durable-time table data generated by said table generating unit and an integrated-time storage portion which stores the integrated count data generated by said operating-time integrating unit; and
a determining unit which reads and compares the durable-time table data stored in said table storage portion and the integrated count data stored in said integrated-time storage portion, and generates at least one of the warning data and the interrupt command when the integrated count data has reached the durable-time table data.

* * * * *